United States Patent
Naito

(10) Patent No.: US 11,172,087 B2
(45) Date of Patent: Nov. 9, 2021

(54) MULTIFUNCTION MACHINE, IMAGE SCANNING APPARATUS, CONTROL METHOD FOR MULTIFUNCTION MACHINE, AND COMPUTER READABLE STORAGE MEDIUM, THAT CONTROLS CONVEYANCE OF A DOCUMENT ON THE BASIS OF THE THICKNESS OF THE DOCUMENT

(71) Applicant: CANON KABUSHIKI KAISHA, Tokyo (JP)

(72) Inventor: Yosui Naito, Nagareyama (JP)

(73) Assignee: Canon Kabushiki Kaisha, Tokyo (JP)

(\*) Notice: Subject to any disclaimer, the term of this patent is extended or adjusted under 35 U.S.C. 154(b) by 0 days.

(21) Appl. No.: 16/719,059

(22) Filed: Dec. 18, 2019

(65) Prior Publication Data

US 2020/0213460 A1 Jul. 2, 2020

(30) Foreign Application Priority Data

Dec. 27, 2018 (JP) .............................. JP2018-246038

(51) Int. Cl.
*G06K 15/00* (2006.01)
*H04N 1/00* (2006.01)

(52) U.S. Cl.
CPC ..... *H04N 1/00588* (2013.01); *H04N 1/00408* (2013.01); *H04N 1/00689* (2013.01);
(Continued)

(58) Field of Classification Search
CPC ........... H04N 1/00408; H04N 1/00795; H04N 1/00716; H04N 1/00694; H04N 1/00689; H04N 1/00588
(Continued)

(56) References Cited

U.S. PATENT DOCUMENTS 5,721,627 A * 2/1998 Kamiya ............. H04N 1/00352
358/496
2012/0013955 A1* 1/2012 Ikeda ..................... H04N 1/203
358/461
(Continued)

FOREIGN PATENT DOCUMENTS

CN  1098359 A  2/1995
CN  206117805 A  4/2017
(Continued)

*Primary Examiner* — Henok Shiferaw
(74) *Attorney, Agent, or Firm* — Canon U.S.A., Inc. I.P. Division

(57) ABSTRACT

A control method for a multifunction machine includes detecting placement of a document on a document tray, displaying an object in accordance with document placement detection, storing information indicating the thickness of the document set using the object, conveying the document based on the information, and scanning the conveyed document. The object is displayed in accordance with document placement detection while a function selection screen is displayed, the information is received from a user through the object, and the document is conveyed based on the information in a case where execution of the copy function is commanded through a copy screen displayed after selection of the copy function. Even when a user places a document while a function selection screen is displayed, the thickness of the document can be set with certainty, and the document is scanned based on the set thickness.

12 Claims, 13 Drawing Sheets

(52) U.S. Cl.
CPC ..... *H04N 1/00694* (2013.01); *H04N 1/00716* (2013.01); *H04N 1/00795* (2013.01)

(58) Field of Classification Search
USPC ........................................................ 358/1.12
See application file for complete search history.

(56) References Cited

U.S. PATENT DOCUMENTS

| | | | |
|---|---|---|---|
| 2017/0075278 A1* | 3/2017 | Yoshimura | G03G 15/607 |
| 2017/0336748 A1* | 11/2017 | Maejima | G03G 15/6514 |
| 2018/0335718 A1* | 11/2018 | Chikugo | G03G 15/087 |
| 2019/0212684 A1* | 7/2019 | Watanabe | G03G 15/5016 |
| 2019/0227426 A1* | 7/2019 | Hayamizu | H04N 1/00681 |
| 2020/0137259 A1* | 4/2020 | Totsuka | H04N 1/00652 |
| 2020/0137261 A1* | 4/2020 | Hirao | H04N 1/32683 |
| 2020/0236238 A1* | 7/2020 | Shibata | H04N 1/00588 |
| 2021/0048770 A1* | 2/2021 | Kawabata | G03G 15/6555 |

FOREIGN PATENT DOCUMENTS

| | | |
|---|---|---|
| CN | 106904465 A | 6/2017 |
| CN | 111131649 A | 5/2020 |
| JP | 6-24604 A | 2/1994 |
| JP | H0624604 A | 2/1994 |

\* cited by examiner

FIG. 7

| APPARATUS SETTINGS | |
|---|---|
| PAPER THICKNESS SETTING | THICK |
| .... | .... |

| COPY SETTINGS | |
|---|---|
| PAPER THICKNESS SETTING | THICK |
| PAGE PRINTING | YES |
| N-UP PRINTING | NO |
| BOOKBINDING | NO |
| NUMBER OF COPIES | 5 |
| .... | .... |

| FAX SETTINGS | |
|---|---|
| PAPER THICKNESS SETTING | THICK |
| RESOLUTION | 200 x 100 dpi |
| LINE SELECTION | AUTOMATIC |
| .... | .... |

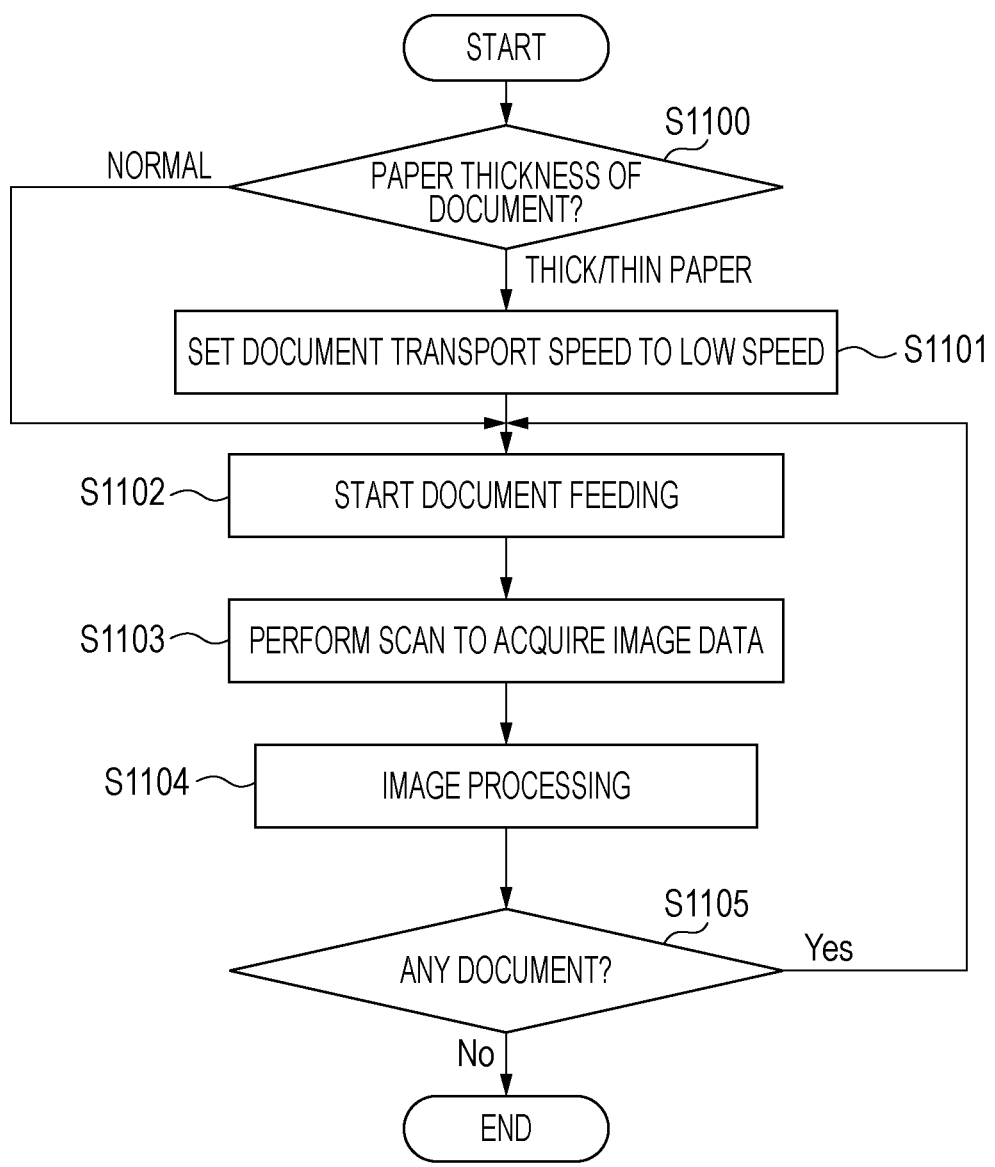

MULTIFUNCTION MACHINE, IMAGE SCANNING APPARATUS, CONTROL METHOD FOR MULTIFUNCTION MACHINE, AND COMPUTER READABLE STORAGE MEDIUM, THAT CONTROLS CONVEYANCE OF A DOCUMENT ON THE BASIS OF THE THICKNESS OF THE DOCUMENT

BACKGROUND

Field

The present disclosure relates to a multifunction machine that controls conveyance of a document on the basis of the thickness of the document, an image scanning apparatus, a control method for the multifunction machine, and a computer readable storage medium.

Description of the Related Art

In a case where a document to be scanned by an automatic document conveying apparatus is a thick paper sheet, a paper jam tends to occur at a curved portion of a conveyance path because the load on the conveyance roller increases. In addition, in a case where a document is a thin paper sheet, the weight of the document itself is light. Thus, when the document is discharged, it takes time for the document to fall down and completely settle on the paper output unit, and the rear end of the document may collide with the front end of the subsequent document, which may cause a jam and poor piling.

In order to cope with this, hitherto, there is an apparatus that detects the thickness of a document using a sensor and that changes the document conveying speed in accordance with the thickness (Japanese Patent Laid-Open No. 6-24604).

SUMMARY

As another method, when the user places a document while a copy screen is displayed, the user may set the thickness of the document. Consequently, the thickness of the document can be recognized without using any sensor.

However, it has now been determined that with the related art, the user may place a document at various timings, and does not always place a document while a copy screen is displayed.

Furthermore, although some recent image scanning apparatuses display a function selection screen for making a selection from a copy function and a data transmission function at the time of start-up or on standby, when a document is placed while such a function selection screen is displayed, a screen through which the thickness of the document is set is not displayed, and thereafter, after a copy function is selected and a copy screen is displayed, the user cannot set the thickness of the document.

In accordance with an aspect of the present disclosure, a multifunction machine includes a detection unit configured to detect that a document is placed on a document tray, a display unit configured to display, in accordance with detection of placement of the document on the document tray by the detection unit, an object used to set a thickness of the document, a storage unit configured to store information indicating the thickness of the document set using the object, a conveying unit configured to convey the document based on the information indicating the thickness of the document and stored in the storage unit, and a scanning unit configured to scan the document conveyed by the conveying unit, and the object is displayed in accordance with detection of placement of the document while a function selection screen through which a copy function and a data transmission function are selected is displayed, the storage unit stores the information indicating the thickness of the document, the information received from a user through the object, and the conveying unit conveys the document based on the information indicating the thickness of the document stored in the storage unit in a case where execution of the copy function is commanded through a copy screen displayed after selection of the copy function.

Further features of the present disclosure will become apparent from the following description of exemplary embodiments with reference to the attached drawings.

BRIEF DESCRIPTION OF THE DRAWINGS

FIG. 7 is a diagram illustrating the structure of set values stored in a random access memory (RAM).

FIG. 9 is a flow chart illustrating execution of a scan according to the first embodiment.

DESCRIPTION OF THE EMBODIMENTS

In the following, embodiments of the present disclosure will be described using the drawings.

First Embodiment

Figure 1:
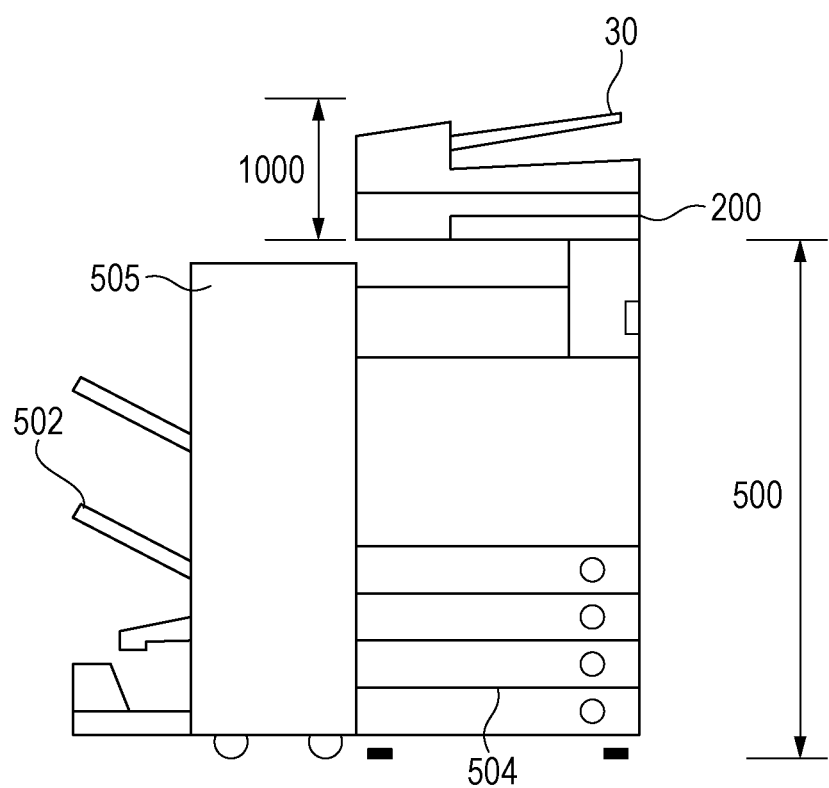
FIG. 1 is a diagram illustrating an example of the exterior of an image forming apparatus according to the present embodiment.

FIG. 1 is a diagram illustrating an example of the exterior of an image forming apparatus according to the present embodiment.

The image forming apparatus according to the present embodiment includes an image scanning unit 200 and an image forming unit 500.

The image scanning unit 200 converts information of an image on a document into an electrical signal by inputting, to a linear image sensor (a charge-coupled device (CCD) sensor), reflected light obtained by performing an exposure scan on the image with light emitted from an illumination lump. The image scanning unit 200 further converts the electrical signal into a luminance signal including RGB color signals, and outputs the luminance signal as image data to a controller unit 400 to be described later.

A document is set on a document tray 30 of an automatic document feeder (hereinafter referred to as an ADF) 1000. Upon accepting a scan processing execution command from an operation unit 405 operated by a user and to be described later, the controller unit 400 sends a document scan command to the image scanning unit 200. Upon receiving this command, the image scanning unit 200 feeds the document, one paper sheet at a time, from the document tray 30 of the ADF 1000 to perform a document scan operation. In addition, the user may place the document on a document glass to be described later and scanning may be performed.

The image forming unit 500 is an image forming device that forms, on a paper sheet, an image based on the image data received from the controller unit 400.

An image forming system according to the present embodiment is an electrophotographic system using a photoconductor drum and a photoconductor belt. In addition, the image forming unit 500 includes a plurality of cassettes serving as a paper feeding unit 504 and capable of handling different paper sheet sizes or different paper sheet orientations. In addition, a paper discharging unit 502 discharges printed paper sheets. A finisher unit 505 performs, on paper sheets, postprocessing such as stapling processing and punching processing on the basis of settings set by the user.

Figure 2:
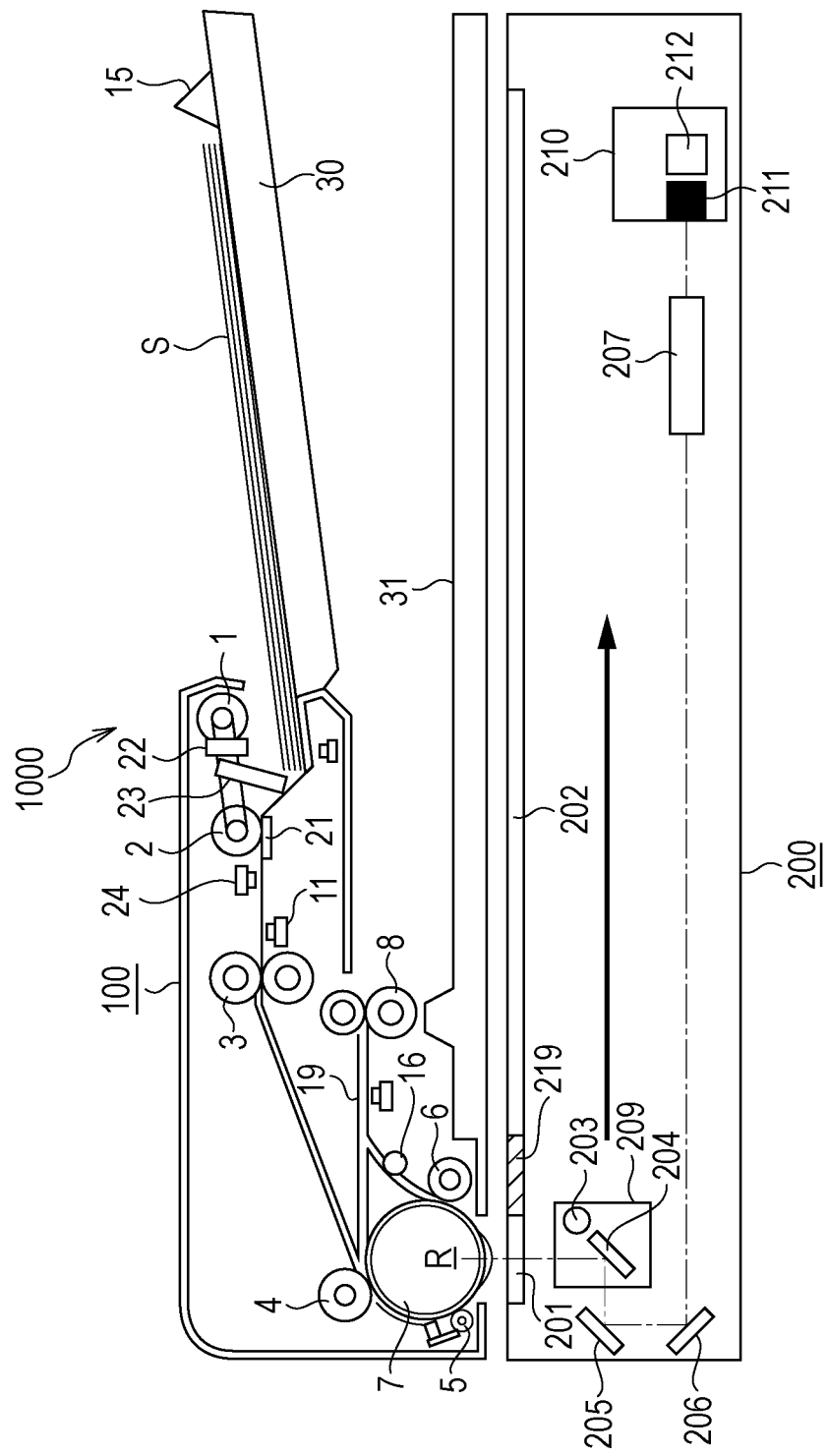
FIG. 2 is a cross section schematically illustrating an example of the configuration of an automatic document feeder (ADF) and an image scanning unit according to the present embodiment.

FIG. 2 is a cross section schematically illustrating an example of the configuration of the ADF 1000 and the image scanning unit 200 according to the present embodiment.

The operation of the ADF 1000 will be described with reference to FIG. 2. The ADF 1000 illustrated in FIG. 2 includes a document tray 30, a separation pad 21, and a paper feed roller 1. On the document tray 30, a document bundle S including one or more document sheets is loaded. The separation pad 21 restricts the document bundle S from jutting out downstream of the document tray 30 before document conveyance is started. Furthermore, the ADF 1000 includes a document detection sensor 23, a distance measuring sensor 22, and a separation sensor 24. The document detection sensor 23 detects that a document is loaded on the document tray 30. The distance measuring sensor 22 measures the distance to the uppermost surface of the document bundle S. The separation sensor 24 detects that a document has passed through a separation roller 2. The document detection sensor 23 detects the loading of a document when the document detection sensor 23 is moved by an end of the document, which is inserted into the ADF 1000. Note that the document detection sensor 23 may be provided under a document and detect placement of the document. The paper feed roller 1 falls onto a document surface of the document bundle S loaded on the document tray 30 and rotates. Accordingly, the document at the upper most surface of the document bundle S is fed. By the operation of the separation roller 2 and the separation pad 21, a sheet is separated from the document conveyed by the paper feed roller 1. This separation is realized by an existing retard separation technology. In this case, if no document is detected by the separation sensor 24 even after a predetermined time (t1) has elapsed after the start of the conveyance, for example, the driving of the paper feed roller 1 is stopped. The predetermined time period (t1) until the driving is stopped is determined by adding a sufficient time period set by taking a delay into consideration to an estimated time period to reach the separation sensor 24 from the start of the conveyance, the estimation being performed in accordance with the conveying speed.

The document separated by the separation roller 2 and the separation pad 21 is conveyed to a registration roller 4 by a conveyance roller 3, and the document is hit against the registration roller 4. Accordingly, the document is formed in a loop shape, and skewing during document conveyance is eliminated. A paper feed path is arranged downstream of the registration roller 4. Through the paper feed path, the document that has passed through the registration roller 4 is conveyed in the direction toward a flow-scan glass 201.

The document sent to the paper feed path is sent onto a platen by a large roller 7 and a conveyance roller 5. Here, the large roller 7 is in contact with the flow-scan glass 201. The document conveyed by the large roller 7 passes through a conveyance roller 6, is moved between a roller 16 and a movement glass, and is discharged onto a document output tray 31 via a discharge flapper and a paper discharge roller 8.

The ADF 1000 of FIG. 2 is a type of apparatus that flips a document and scans the rear side of the document. The ADF 1000 moves the document to a reversing path 19 by reversing the rotation of the paper discharge roller 8 and by performing discharge flapper switching in a state in which the document is caught by the paper discharge roller 8. The ADF 1000 eliminates skewing during document conveyance by hitting the moved document against the registration roller 4 from the reversing path 19 and by forming the document in a loop shape again. Thereafter, the ADF 1000 moves the document again by the conveyance roller 5 and the large roller 7 to the flow-scan glass 201, and the rear side of the document can be scanned through the flow-scan glass 201.

In addition, the document tray 30 is provided with a guide restriction plate 15, which is slidable in a sub-scanning direction of a loaded document bundle, and a document width detection sensor (not illustrated), which detects a document width in conjunction with the guide restriction plate 15. The document size of a document bundle loaded on the document tray 30 can be determined by a combination of the document width detection sensor and a sensor 11 positioned before the registration roller 4. In addition, a document length detection sensor (not illustrated) provided in the conveyance path can also detect a document length from the conveyance distance obtained by detecting the front end and the last end of the document that is being conveyed. In addition, the document size can be determined also from a combination of the detected document length and the document width detection sensor.

Example of Configuration of Image Scanning Unit 200

The image scanning unit 200 optically scans an image recorded on a document on a document glass 202 by using an optical scanner unit 209 performing a scan in a sub-scanning direction indicated by an arrow in FIG. 2. In addition, the image scanning unit 200 controls the ADF 1000 and conveys the document on the document tray 30 to a scanning position on a one sheet basis. Furthermore, the image scanning unit 200 moves the optical scanner unit 209 to a scanning center position of the large roller 7 of the ADF 1000, and scans the document at the scanning position of the large roller 7. A document on the document tray 30 of the ADF 1000 or a document on the document glass 202 is scanned by the following optical system. This optical system includes the flow-scan glass 201, the document glass 202, the optical scanner unit 209 having a lamp 203 and a mirror 204, mirrors 205 and 206, a lens 207, and a charge-coupled device (CCD) sensor unit 210. Information of the scanned image is photoelectrically converted and is then input as image data to a controller, which is not illustrated in FIG. 2.

In addition, a white plate 219 is a white plate for generating white level reference data for shading.

In the present embodiment, the CCD sensor unit 210 includes a CCD (a three-line sensor unit) 212 for scanning color images (RGB), which is hereinafter referred to as the color image scanning CCD 212, and a CCD (a one-line sensor unit) 211 for scanning monochrome images, which is hereinafter referred to as the monochrome image scanning CCD 211.

Figure 3:
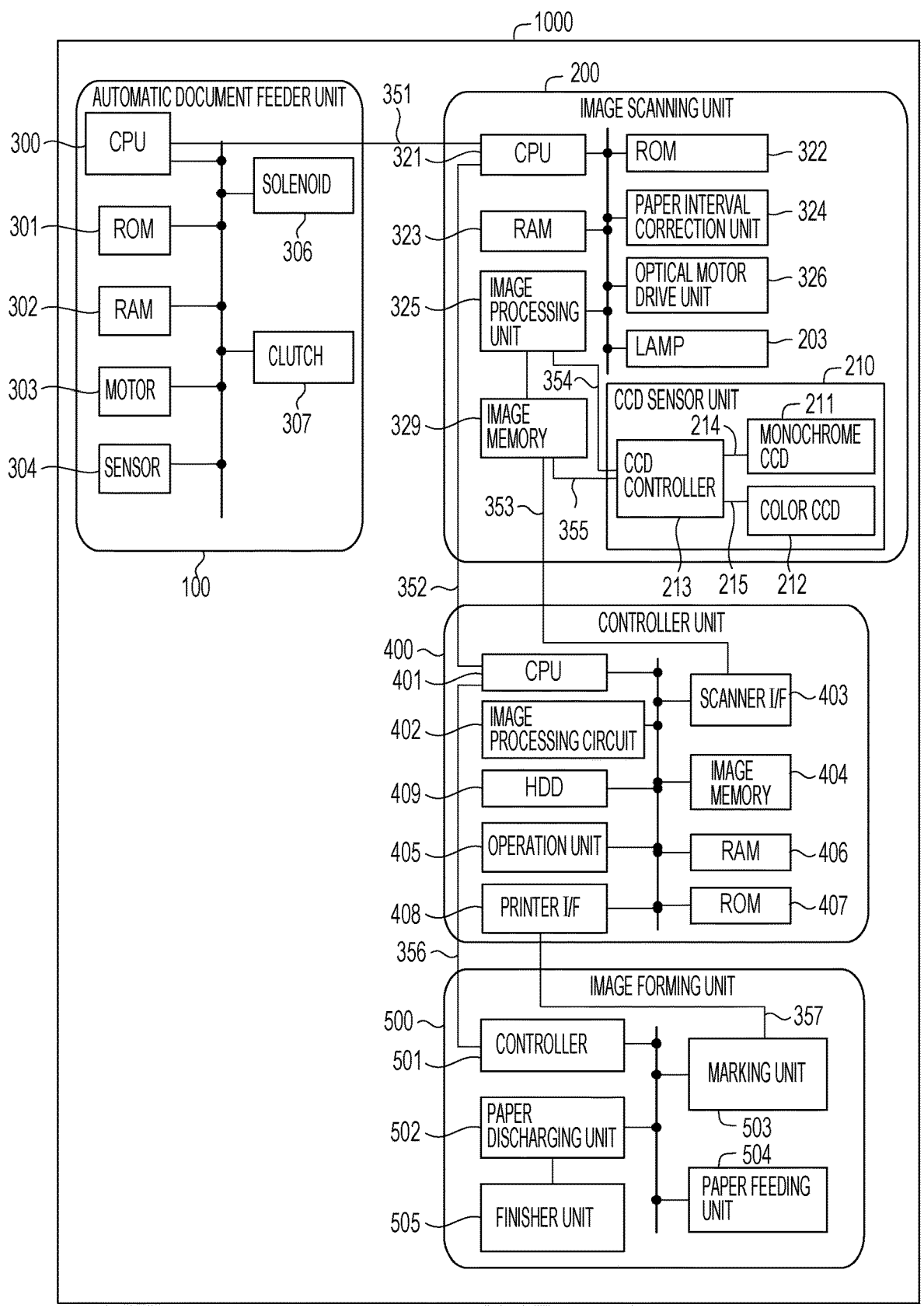
FIG. 3 is a block diagram illustrating the configuration of an image forming apparatus according to the present embodiment.

FIG. 3 is a block diagram illustrating the configuration of an image forming apparatus according to the present embodiment.

The control block of the ADF 1000 includes a control unit that is a central processing unit (hereinafter referred to as a CPU) 300, a read-only memory (hereinafter referred to as a ROM) 301, a random access memory (hereinafter referred to as a RAM) 302, an output port, and an input port. The ROM 301 stores a control program and fixed parameters, and the RAM 302 stores input data and work data.

A motor 303, a solenoid 306, and a clutch 307 are connected to the output port, the motor 303 driving various conveyance rollers. Various sensors 304 are each connected to the input port.

The CPU 300 controls paper conveyance in accordance with the control program stored in the ROM 301, the CPU 300 being connected to the ROM 301 via a bus line. The CPU 300 performs serial communication with the central processing unit (CPU) 321 of the image scanning unit 200 via a control communication line 351, and transmits and receives control data to and from the image scanning unit 200. In addition, a front-end image signal, which is a reference of a front end of document image data, is also reported to the image scanning unit 200 via the control communication line 351.

In addition, the CPU 300 reports values of the various sensors 304 to the image scanning unit 200 in accordance with control data from the CPU 321 of the image scanning unit 200.

Control Block of Image Scanning Unit 200

In the control block of the image scanning unit 200, the CPU 321 controls the entirety of the image scanning unit 200. A ROM 322 and a RAM 323 are connected to the CPU 321. The ROM 322 stores programs, and the RAM 323 provides a work area. Note that the RAM 323 indicates a work area also including an area where nonvolatile memory is performed.

An optical motor drive unit 326 is a driver circuit used to drive an optical drive motor. The lamp 203 and the CCD sensor unit 210 (the monochrome image scanning CCD 211 for front-side images and the color image scanning CCD 212 for front-side images) are connected to the image scanning unit 200. The CPU 321 performs image scan processing by controlling the optical motor drive unit 326 and by controlling the CCD sensor unit 210 via an image processing unit 325.

In order to realize paper conveyance, the CPU 321 commands the CPU 300, which is for controlling paper conveyance of the ADF 1000, by sending a command regarding paper conveyance control via the control communication line 351. The CPU 300, which has received the command, realizes paper conveyance by monitoring each sensor 304 installed on the conveyance path and by driving the motor 303 for conveyance, the solenoid 306, and the clutch 307, which are loads. In this manner, the CPU 321 controls paper conveyance performed by the ADF 1000 and an image scan performed by the image scanning unit 200. A paper interval correction processing unit configured to perform paper interval correction is denoted by reference numeral 324.

An image signal of an image formed on the CCD sensor unit 210 (either the color image scanning (RGB) CCD 212 or the monochrome image scanning CCD 211) by the lens 207 is converted into digital image data. The resulting image data further undergoes various types of image processing including shading and detection and correction of streak images and the like on the image data at the image processing unit 325, and is then written into an image memory 329.

The data written into the image memory 329 is sequentially transmitted to the controller unit 400 through a controller-interface image communication line 353 including an image transfer clock signal line. Furthermore, a front-end image signal, which is a reference for the front end of document image data, is reported to the controller unit 400 through a controller-interface control communication line 352 after timing adjustment is performed by the CPU 321. The front-end image signal reported through a communication line from the ADF 1000 is also reported to the controller unit 400 through the controller-interface control communication line 352 after adjustment is similarly performed by the CPU 321.

The CPU 321 controls the image processing unit 325, which is connected to a control bus line. Furthermore, the CPU 321 controls the CCD sensor unit 210 by transferring a control signal from a control communication line 354 via the image processing unit 325 to the CCD sensor unit 210. In a process in which the CCD sensor unit 210 scans the document, a scan is performed by the color image scanning CCD 212 or the monochrome image scanning CCD 211. An analog image signal obtained by performing a scan on a line by line basis is then output from an image data communication line 214 or 215 including an image transfer clock signal line to a CCD controller 213.

The analog signal is converted into digital image data by the CCD controller 213, and the digital image data is transmitted to the controller unit 400 from an image data information communication line 355 including an image transfer clock signal line via the image memory 329 and then via an image data information communication line 353.

The CPU 321 performs serial communication with the central processing unit (CPU) 401 of the controller unit 400 via the control communication line 352, and transmits and receives control data to and from the controller unit 400. The CPU 321 performs a shape abnormality detection operation on the document that is being conveyed, in accordance with control data from the CPU 401 of the controller unit 400. In the shape abnormality detection operation, the difference between the distance to the uppermost surface of the document S measured before the start of conveyance and the distance to the uppermost surface of the document S measured after a predetermined time (t2) from the start of the conveyance is calculated on a sheet by sheet basis. In a case where there is a difference (dl) greater than or equal to a predetermined value, it is determined that the document has shape abnormality. The CPU 321 then reports the determination result to the CPU 401 of the controller unit 400.

Control Block of Controller Unit 400

The controller unit 400, which is for image processing, is a device that controls the entirety of the image forming apparatus including the ADF 1000, the image scanning unit 200, and the image forming unit 500. The controller unit 400 includes the CPU 401, an image processing circuit 402, a scanner I/F 403, an image memory 404, the operation unit 405, a RAM 406, a ROM 407, a printer I/F 408, and a hard disk drive (HDD) 409. The RAM 406 provides a work area, and the ROM 407 stores programs.

Note that the RAM 406 indicates a work area also including an area where nonvolatile memory is performed. The ROM 407 and the HDD 409 are examples of a computer-readable storage medium.

In addition, the controller unit 400 may also be configured such that a program is loaded into the RAM 406 from the HDD 409, and the CPU 401 executes the program.

The image data transmitted to the controller unit 400 through the image data information communication line 353 is stored in the image memory 404 via the scanner I/F 403.

The image processing circuit 402 converts an image on the image memory 404 and returns the resulting image to the image memory 404. Image conversion processing performed by the image processing circuit 402 includes rotation processing in which images in units of 32 pixels×32 pixels are rotated by a specified angle and resolution conversion processing in which the resolution of an image is converted. Furthermore, the image conversion processing performed by the image processing circuit 402 includes scaling processing in which an image is scaled and color space conversion processing in which a YUV image is converted into a Lab image by performing a matrix operation on an input multi-level image and by using a look-up table (LUT). In this color space conversion, a 3×8 matrix operation is performed and a one-dimensional LUT is used, and publicly known background removal and show-through prevention can be performed.

Note that the controller unit 400 includes an unillustrated network I/F, and transmits and receives image data and other data to and from external personal computers (PCs).

Control Block of Image Forming Unit 500

The image forming unit 500 conveys a recording paper sheet (sheet), prints image data in the form of a visible image on the sheet, and discharges the sheet to outside the apparatus. The image forming unit 500 includes a controller 501, the paper feeding unit 504, and a marking unit 503. The controller 501 controls the image forming unit 500. The paper feeding unit 504 has a plurality of types of recording paper cassettes. The marking unit 503 has the function of transferring and fixing image data onto a recording paper sheet. Furthermore, the image forming unit 500 includes the paper discharging unit 502 and a finisher unit 505. The paper discharging unit 502 has the function of outputting printed recording paper sheets to outside the apparatus. The finisher unit 505 performs punching processing and sorting processing.

In a case where image forming is ready at the marking unit 503, the controller 501 transmits a front-end image signal, which is a reference for the front end of the document image data, to the controller unit 400 through a controller-interface control communication line 356.

The marking unit 503 transfers and fixes, onto a recording paper sheet, image data transmitted through a controller-interface image communication line 357.

Figure 4:
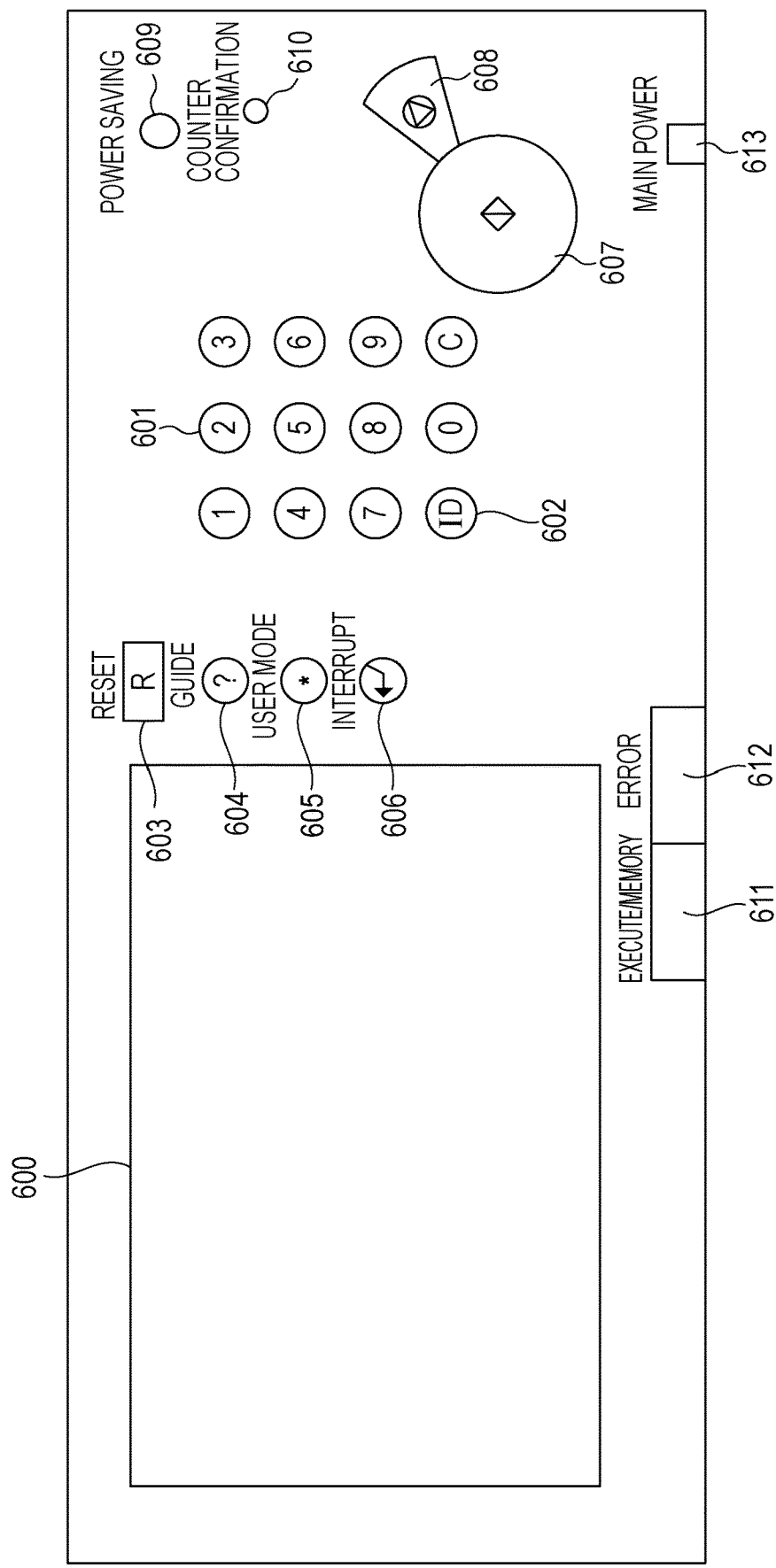
FIG. 4 is a diagram illustrating an operation unit.

In the following, the operation unit 405 illustrated in FIG. 3 will be described with reference to FIG. 4. A liquid crystal display (LCD) touch panel 600 is used to set major mode settings and to display statuses. A numeric key pad 601 accepts input of numerical values from 0 to 9. An identification (ID) key 602 is used to input a division number and a PIN mode in a case where the apparatus is managed on a division basis.

A reset key 603 is a key for resetting a set mode. A guide key 604 is a key for displaying a screen that describes each mode. An interrupt key 606 is a key for performing interrupt copying.

A start key 607 is a key for accepting a copy execution command and a scan execution command. A stop key 608 is a key for terminating an active job, examples of which are a copy job and a scan job.

A user mode key 605 is a key for entering a user mode screen. Through the user mode screen, the image forming apparatus accepts various settings regarding the apparatus.

A power saving key 609 is a key for causing the image forming apparatus to enter the power saving state. In a case where the power saving key 609 is selected again when the image forming apparatus is in the power saving state, the image forming apparatus returns from the power saving state.

A counter confirmation key 610 is a key for displaying, on the LCD, a count screen displaying the total number of copies made so far.

A light-emitting diode (LED) 611 indicates that a job is being executed and that an image is being stored into an image memory. An error LED 612 indicates that the apparatus is in an error state, examples of which are a paper jam and the door of the apparatus being open. A power supply LED 613 indicates that the main switch of the apparatus is ON.

Figure 5A:
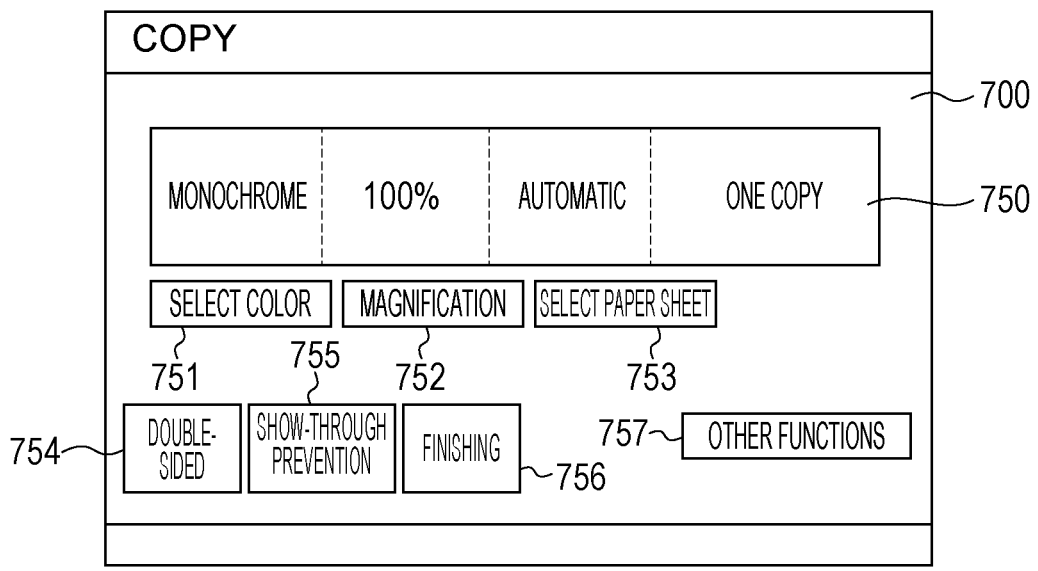
FIGS. 5A and 5B illustrate an example of a copy screen to be displayed on a liquid crystal display (LCD) touch panel.

A copy screen 700 of FIG. 5A is a screen displayed on the LCD touch panel 600. As basic settings, a "color selection" setting button 751, a "magnification" setting button 752, and a "sheet selection" setting button 753 are arranged as in the copy screen 700 of FIG. 5A, and the setting statuses of these buttons are displayed and denoted by 750. Settings other than the basic settings are selectable by pressing an "other functions" button 757. Although not illustrated in this case, for the "other functions" button 757, various functions such as page printing, N-up printing, and bookbinding are prepared. In addition, document paper thickness setting is also prepared. For functions frequently used by the user among these functions, shortcut buttons can be generated on the copy screen. In this case, a "double-sided" button 754 for setting double-sided printing and a "show-through prevention" button 755 for setting show-through prevention for documents are arranged. Furthermore, a "finishing" button 756 for setting an output mode at the time of printing and for setting postprocessing is arranged.

Figure 5B:
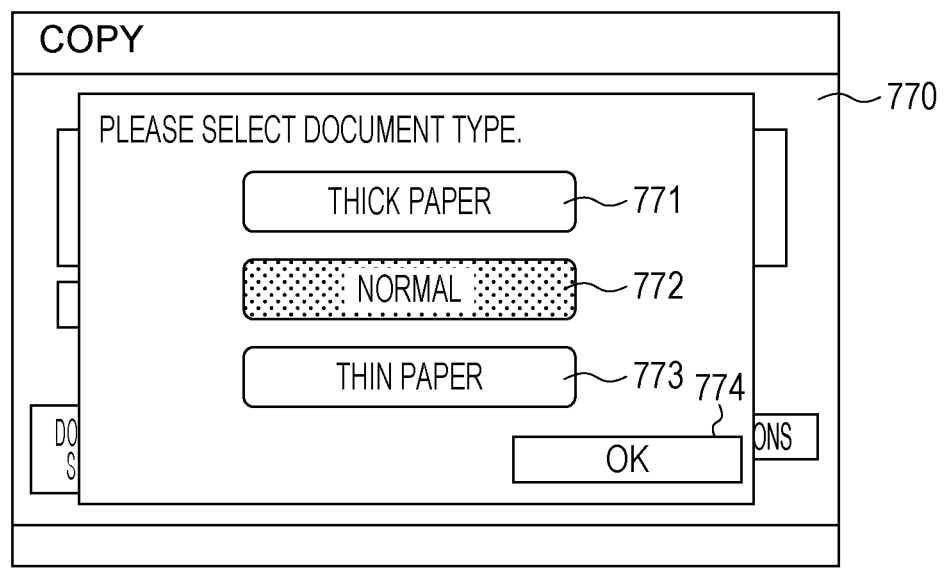

A paper thickness setting screen 770 of FIG. 5B is an example of a screen for setting the thickness of a paper sheet of a document (the thickness of a piece of paper). The paper thickness setting screen 770 of FIG. 5B is displayed when the document detection sensor 23 detects a document. In addition, the paper thickness setting screen 770 can be manually displayed also by selecting the paper thickness setting from among the various functions corresponding to the "other functions" button 757. On the paper thickness setting screen 770, a "thick paper" button 771, a "normal" button 772, and a "thin paper" 773 can be selected. In this case, the example is described in which the "thick paper" button 771, the "normal" button 772, and the "thin paper" button 773 are displayed; however, the buttons may each be treated as one record and may be displayed as a list. Note that the buttons and the records are examples of objects. The user sets the thickness of a paper sheet by pressing an OK key 774 after selecting a paper thickness. The set paper thickness is stored in the RAM 406.

FIG. 7 is a diagram illustrating an example of set values stored in the RAM 406. Apparatus settings 800 corresponds to an area where set values used in common in the entirety of the apparatus are stored. The apparatus settings 800 includes paper thickness setting 801 as an example. The other apparatus settings are present, but illustration thereof will be omitted. Copy settings 810 corresponds to an area where set values used for the copy function are stored. The copy settings 810 include, as examples, paper thickness setting 811, page printing 812, N-up printing 813, bookbinding 814, and the number of copies 815. The other copy settings are present, but illustration thereof will be omitted. FAX settings 820 corresponds to an area where set values used for the FAX function are stored. The FAX settings 820 include, as examples, paper thickness setting 821, a resolution 822, and line selection 823. The other FAX settings are present, but illustration thereof will be omitted. Note that there are areas where set values for functions other than the copy and FAX functions are stored; however, illustration thereof will be omitted.

The paper thickness setting is present in the apparatus settings 800, the copy settings 810, and the FAX settings 820. When the copy screen 700 is displayed, data of the paper thickness setting 811 of the copy settings 810 is overwritten with the value set in the paper thickness setting 801 of the apparatus settings 800. In addition, information on the paper thickness set through the paper thickness setting screen 770 displayed on the copy screen 700 is stored in both of the paper thickness setting 801 of the apparatus settings 800 and the paper thickness setting 811 of the copy settings 810. Similarly, when a FAX screen 710 is displayed, data of the paper thickness setting 821 of the FAX settings 820 is overwritten with the value set in the paper thickness setting 801 of the apparatus settings 800. In addition, information on the paper thickness set through the paper thickness setting screen 770 displayed on the FAX screen 710 is stored in both of the paper thickness setting 801 of the apparatus settings 800 and the paper thickness setting 821 of the FAX settings 820.

Figure 6A:
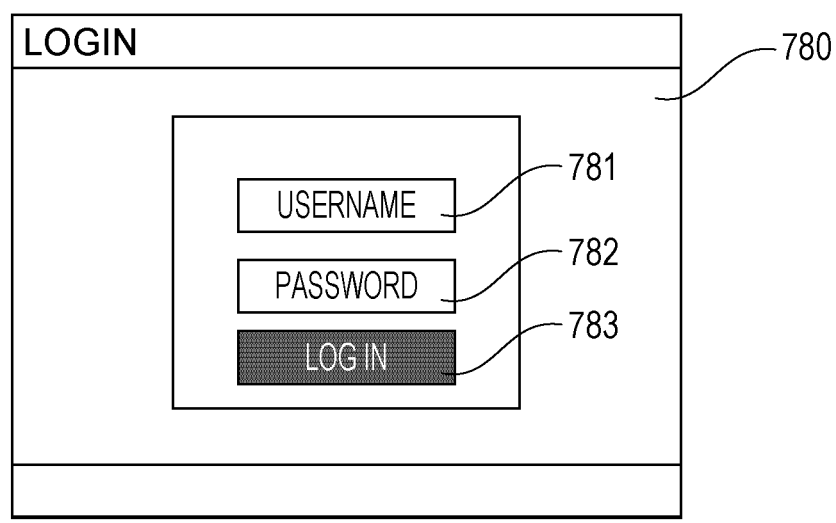
FIGS. 6A, 6B, 6C, and 6D illustrate an example of a login screen and a home screen to be displayed on the LCD touch panel.

FIG. 6A illustrates an example of a login screen 780 to be displayed on the LCD touch panel 600. A text field 781 is a field for inputting a username. A text field 782 is a field for inputting a password. A text field 783 is a button selected when a login is performed. Although not illustrated, the apparatus may also be configured to accept a login performed when a non-contact ID card is placed near a card reader. In this case, instead of the screen 780 of FIG. 6A, it is sufficient that a login screen that prompts a user to place a card near the card reader is displayed.

Figure 6B:
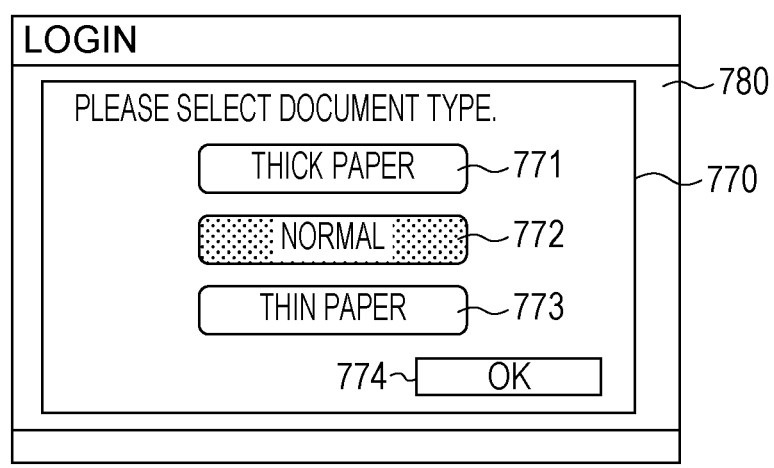

FIG. 6B illustrates an example of a case where the paper thickness setting screen 770 is displayed, through which a document paper thickness is set, while the login screen 780 is displayed. Similarly as in the case of the copy screen 700 of FIG. 5B, the paper thickness setting screen 770 is displayed when the document detection sensor 23 detects a document.

Figure 6C:
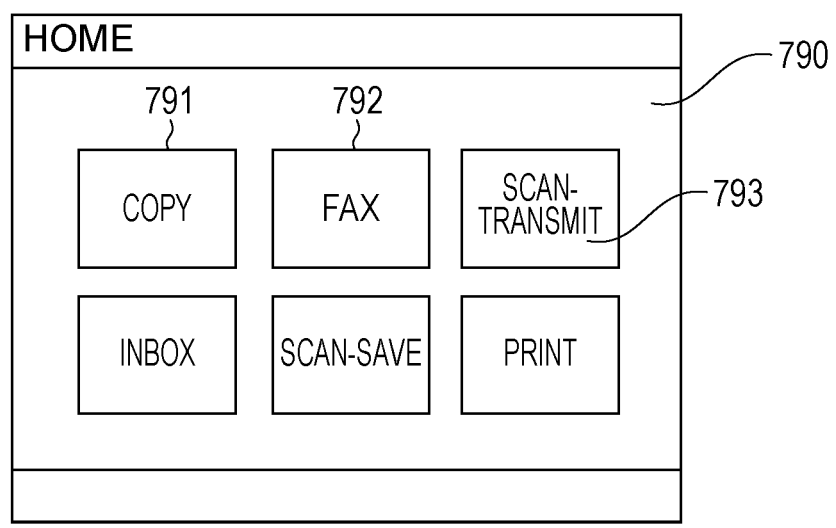

FIG. 6C illustrates an example of a home screen (a function selection screen) 790 to be displayed on the LCD touch panel 600. In response to performing of a login operation on the login screen 780, the home screen 790 is displayed. Various function selection buttons are displayed on the home screen 790. A button 791 is a copy function selection button. In response to selection of the button 791, the copy screen 700 is displayed. The user sets copy function settings through the copy screen 700, and selects the start key 607. In response to selection of the start key 607, an execution command is issued, and then both a scan of a document and print of an image of the scanned document are executed. A button 792 is a FAX function selection button.

In response to selection of the button 792, the FAX screen 710, which is a FAX transmission screen and will be described later, is displayed. The user sets FAX transmission function settings through the FAX transmission screen, and selects the start key 607. In response to selection of the start key 607, an execution command is issued, and then both a scan of a document and FAX transmission of an image of the scanned document are executed. A button 793 is a scan transmission selection button. In response to selection of the button 793, a data transmission screen is displayed. The user sets data transmission function settings through the data transmission screen, and selects the start key 607. In response to selection of the start key 607, an execution command is issued, and then a document is scanned and an email to which an image of the scanned document is attached is transmitted. Note that the data transmission function is not only the email transmission function but also a file transmission function such as Server Message Block (SMB) and the File Transfer Protocol (FTP).

Figure 6D:
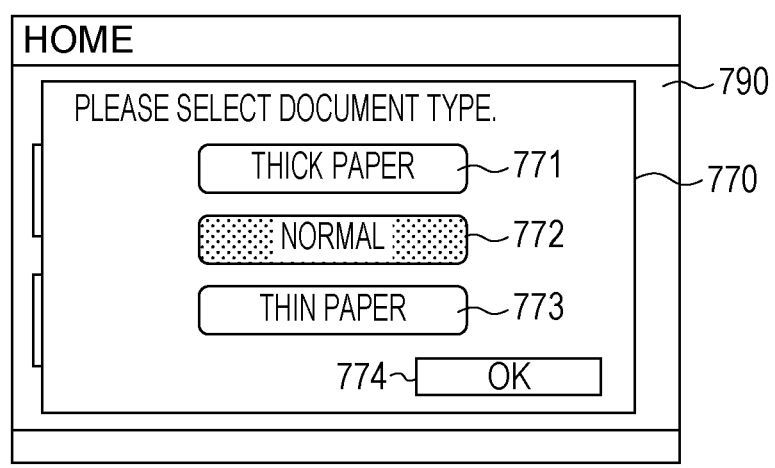

FIG. 6D illustrates an example of a case where the paper thickness setting screen 770 is displayed, through which a document paper thickness is set, while the home screen 790 is displayed. Similarly as in the case of the copy screen 700 of FIG. 5B, the paper thickness setting screen 770 is displayed when the document detection sensor 23 detects a document.

Figure 8:
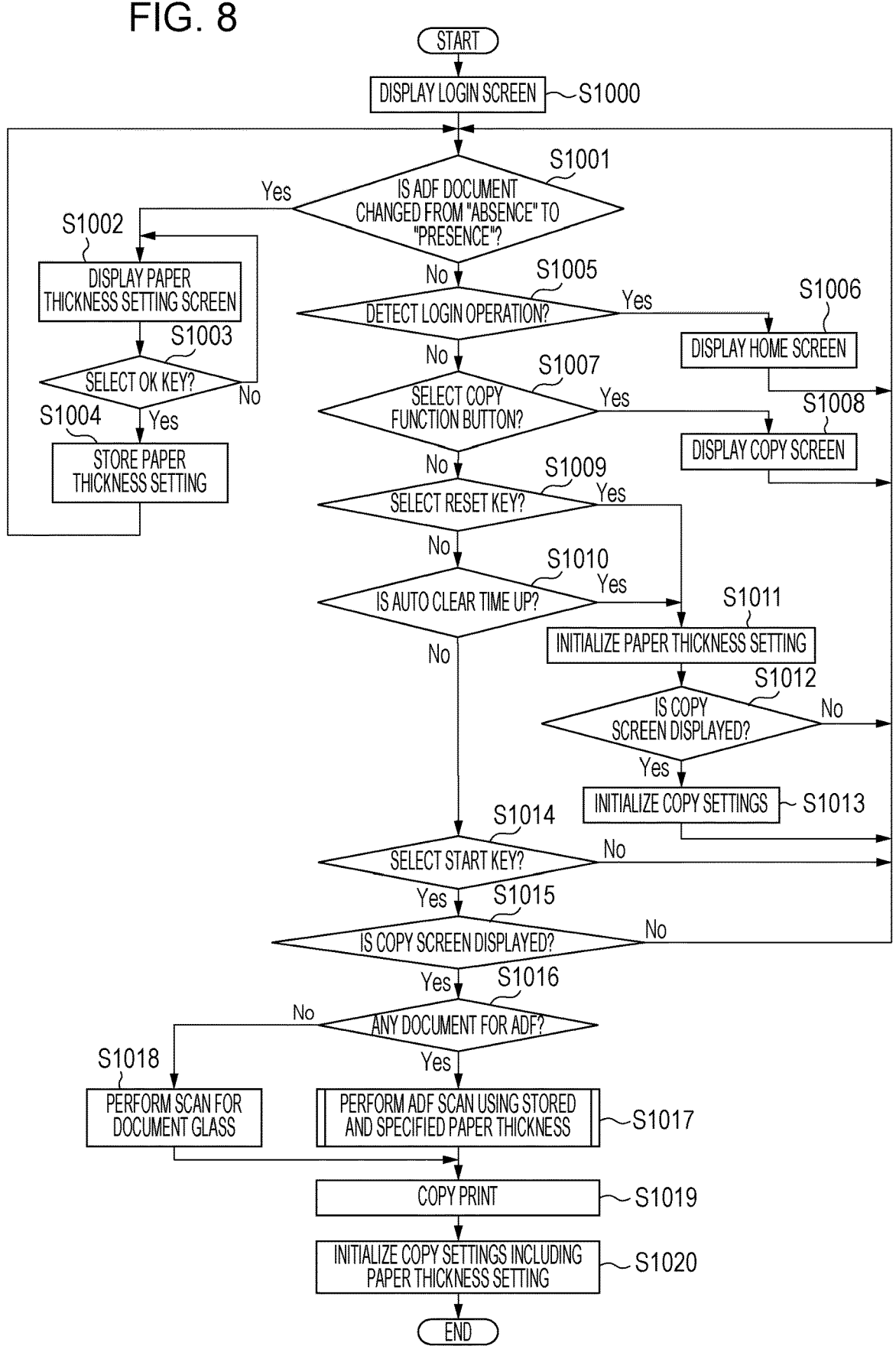
FIG. 8 is a flow chart illustrating transfer of paper thickness setting according to a first embodiment.

Flow Chart of Processing in which Paper Thickness Set Before Proceeding to Copy Screen is Transferred and Used Next, using FIGS. 8 and 9, a flow chart of processing will be described in which in a case where a document is placed on the document tray 30 of the ADF 1000 before a function such as copy is selected, the thickness of a paper sheet of the document is caused to be set, information on the set paper thickness is transferred and used after a function is selected, and a scan is performed. Here, as an example, copy will be described as a function through which a scan is performed; however, the flow chart is applicable to other functions, examples of which are FAX and data transmission. Note that this series of processing processes is performed by the CPU 401 of the controller unit 400 executing a control program that is read out from the ROM 407 and loaded into the RAM 406.

First, in S1000, the CPU 401 causes the LCD touch panel 600 to display the login screen 780 illustrated in FIG. 6A.

Next, in S1001, the CPU 401 determines whether there is a change in the detection state of the document detection sensor 23 of the ADF 1000. In a case where a change from "absence" to "presence" is detected regarding a document, the process proceeds to S1002.

The CPU 401 then causes the LCD touch panel 600 to perform pop-up display such that the paper thickness setting screen 770 illustrated in FIG. 5B is displayed on the login screen 780. Note that, in S1002, instead of the pop-up display, the "thick paper" button 771, the "normal" button 772, and the "thin paper" button 773 may also be displayed on the login screen 780. Here, in a case where the OK key 774 has been selected (Yes in S1003), the CPU 401 stores information (thick paper/normal/thin paper) on the paper thickness selected at the point in time, in the paper thickness setting 801 of the apparatus settings 800 in the RAM 406 (S1004). Note that if the copy screen 700 is displayed at this time, the value is also stored in the paper thickness setting 811 of the copy settings 810 in the RAM 406 (S1004). After S1004, the process returns to S1001. While the OK key 774 is not selected in S1003, display of the paper thickness setting screen 770 is continued.

When No in S1001, the process proceeds to S1005, and it is determined whether a login operation is detected. In a case where a login operation is detected, the process proceeds to S1006, and the CPU 401 causes the LCD touch panel 600 to display the home screen 790 illustrated in FIG. 6C. The process then returns to S1001.

In a case where no login operation is detected in S1005, the process proceeds to S1007, and the CPU 401 determines whether the copy function selection button 791 has been selected. Note that the copy function selection button 791 is a button displayed and selectable only on the home screen 790. Thus, in a case where the home screen 790 is not displayed, the determination in S1007 is always No. When Yes in S1007, the process proceeds to S1008, and the CPU 401 causes the LCD touch panel 600 to display the copy screen 700. The process then proceeds to S1001.

When No in S1007, the process proceeds to S1009, and the CPU 401 determines whether the reset key 603 has been selected. In a case where it is detected that the reset key 603 has been selected, the process proceeds to S1011, and the CPU 401 initializes information on the paper thickness setting 801 of the apparatus settings 800 stored in the RAM 406. Furthermore, it is determined in S1012 whether the copy screen 700 is displayed on the LCD touch panel 600. When the copy screen 700 is displayed, the copy settings 810 stored in the RAM 406 are initialized in S1013, and then the process returns to S1001. In a case where it is determined in S1012 that the copy screen 700 is not displayed, the CPU 401 does not initialize the copy settings 810, and the process returns to S1001.

In a case where selection of the reset key 603 is not detected in S1009, the process proceeds to S1010, and the CPU 401 determines whether it is detected that an auto clear time is up. In a case where the auto clear time is up, the process proceeds to S1011, and the CPU 401 initializes the paper thickness setting 801 of the apparatus settings 800 stored in the RAM 406. The process proceeds to S1012.

In a case where it is not detected in S1010 that the auto clear time up is up, a determination as to whether selection of the start key 607 is detected is performed in S1014. In a case where the start key 607 has not been selected, the process proceeds to S1001. In a case where the start key 607 has been selected, the process proceeds to S1015, and the CPU 401 determines whether the copy screen 700 is displayed on the LCD touch panel 600. In a case where the copy screen 700 is not displayed, the process proceeds to S1001, and in a case where it is determined that the copy screen 700 is displayed, the process proceeds to S1016. In S1016, the CPU 401 determines whether there is a document on the document tray 30 of the ADF 1000 on the basis of a signal from the document detection sensor 23 of the ADF 1000. In a case where it is determined that there is a document on the document tray 30 of the ADF 1000, the process proceeds to S1017, and a scan is performed by the ADF 1000 using information on the paper thickness setting 811 of the copy settings 810 stored in the RAM 406. Details of S1017 will be described later with reference to FIG. 9.

In a case where it is determined in S1016 that no document is on the document tray 30 of the ADF 1000, the process proceeds to S1018, and the CPU 401 performs a scan of a document on the document glass 202. Note that since no document conveyance is performed in this scan and no paper jam could occur, the CPU 401 does not refer to the information on the paper thickness setting 811 stored in the RAM 406.

After the scan is completed, the process proceeds to S1019, and copy printing is performed using the printer I/F 408. After the printing is completed, in S1020, the paper thickness setting 801 and the copy settings 810 stored in the RAM 406 are initialized, and then this processing procedure ends.

Next, details of the ADF scan processing in S1017 in the present embodiment will be described using the flow chart of FIG. 9. The process of FIG. 9 is performed by the CPU 321 of the image scanning unit 200 executing a control program in accordance with a scan execution command from the CPU 401, the control program being read out from the ROM 322 and loaded into the RAM 323. In S1100, the CPU 321 determines a value of the paper thickness setting 811 of the copy settings 810 upon receiving a command to start a document scan from the CPU 401 of the controller unit 400. In a case where the paper thickness determined in S1100 is "normal", the process proceeds to S1102, and the CPU 321 performs control so as to start document feeding. In a case where the paper thickness determined in S1100 is "thick paper" or "thin paper, the process proceeds to S1101, and the CPU 321 sends a notification to the CPU 300 of an ADF unit 100 so as to reduce the document conveying speed to low speed.

The CPU 300, which has received a notification about reduction of the document conveying speed to low speed, reduces the rotational speed of motors that individually drive the conveyance roller 3, the registration roller 4, the conveyance roller 5, the conveyance roller 6, the large roller 7, and the paper discharge roller 8 and performs control so as to realize a speed slower than the normal conveying speed. For example, control is performed such that the conveying speed becomes half the normal conveying speed. Accordingly, in a case where the document is a thick paper sheet, the shortage of torque can be resolved at a curved portion of the conveyance path, and a paper jam due to the document, which is a thick paper sheet, at the curved portion of the conveyance path can be prevented. In contrast, in a case where the document is a thin paper sheet, when the conveying speed is low, the next document is discharged after the document, which is a discharged thin paper sheet, falls down and completely settles. Accordingly, the piling performance of the paper discharging unit 502 increases, and a paper jam due to the document, which is a thin paper sheet, near the paper discharging unit 502 can be prevented.

After S1101, the process proceeds to S1102, and the CPU 321 starts document feeding. The procedure then proceeds to S1103. In S1103, the CPU 321 performs a scan to acquire image data, and the process proceeds to S1104. The acquired image data is transmitted to the controller unit 400 through the image data information communication line 353, and is stored in the image memory 404 via the scanner I/F 403.

In S1104, the CPU 401 performs image processing on the image data stored in the image memory 404. In S1105, the CPU 321 determines whether there is a document on the document tray 30. In a case where there is a document, the process proceeds to S1102, and in a case where there is no document, the process of this flow chart ends.

According to the first embodiment, before the user selects a function, that is, even in a case where a document is placed on the document tray 30 of the ADF 1000 while the login screen 780 or the home screen 790 is displayed, the paper thickness setting can be set and the setting is transferred after selection of a function and is used. Consequently, settings that are not set can be prevented. In addition, since the user can set the paper thickness setting at a timing at which the user places paper sheets on the document tray 30 of the ADF 1000, it increases the usability of the apparatus.

Figure 10A:
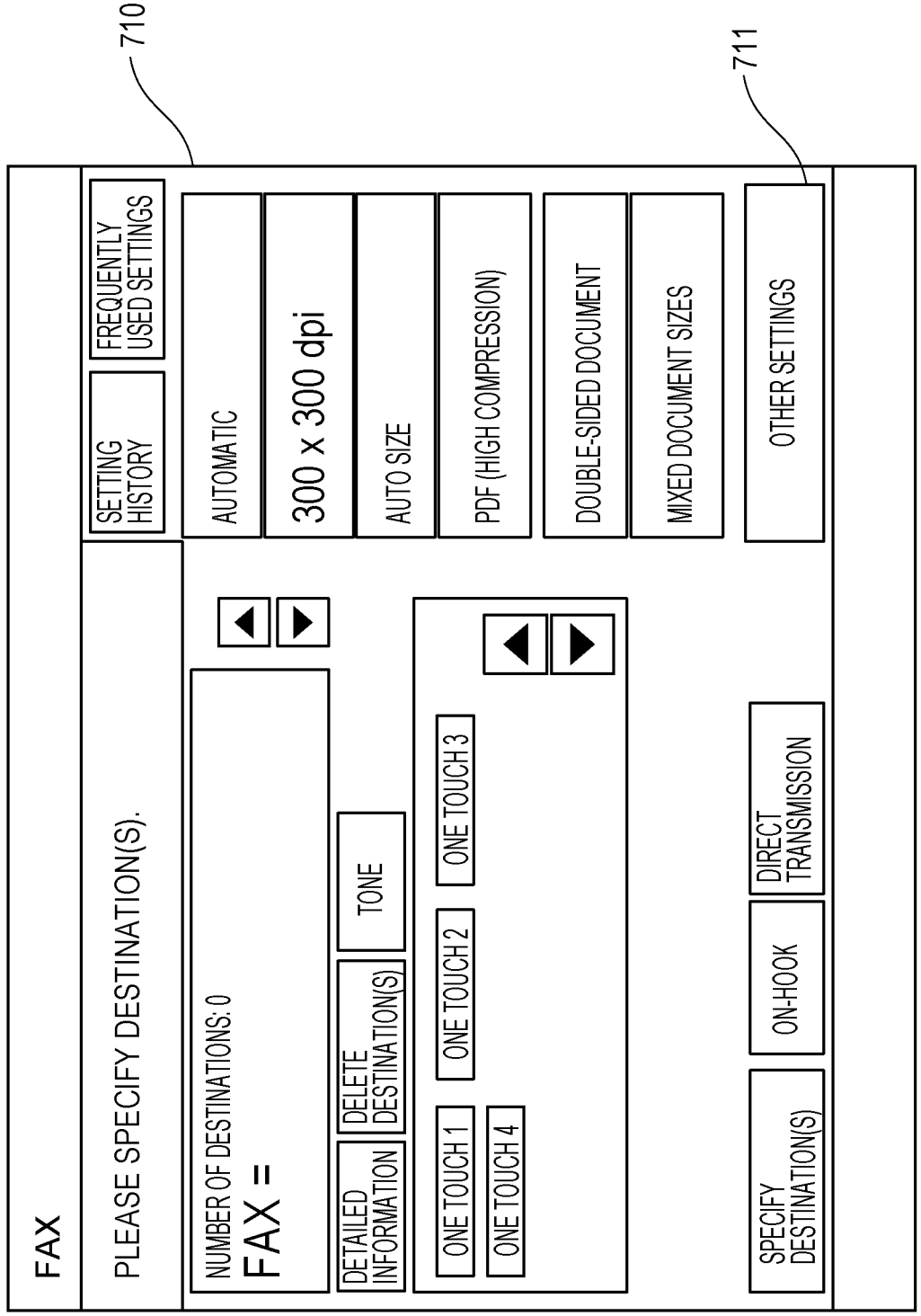
FIGS. 10A and 10B illustrate an example of a facsimile (FAX) screen to be displayed on the LCD touch panel.
Figure 10B:
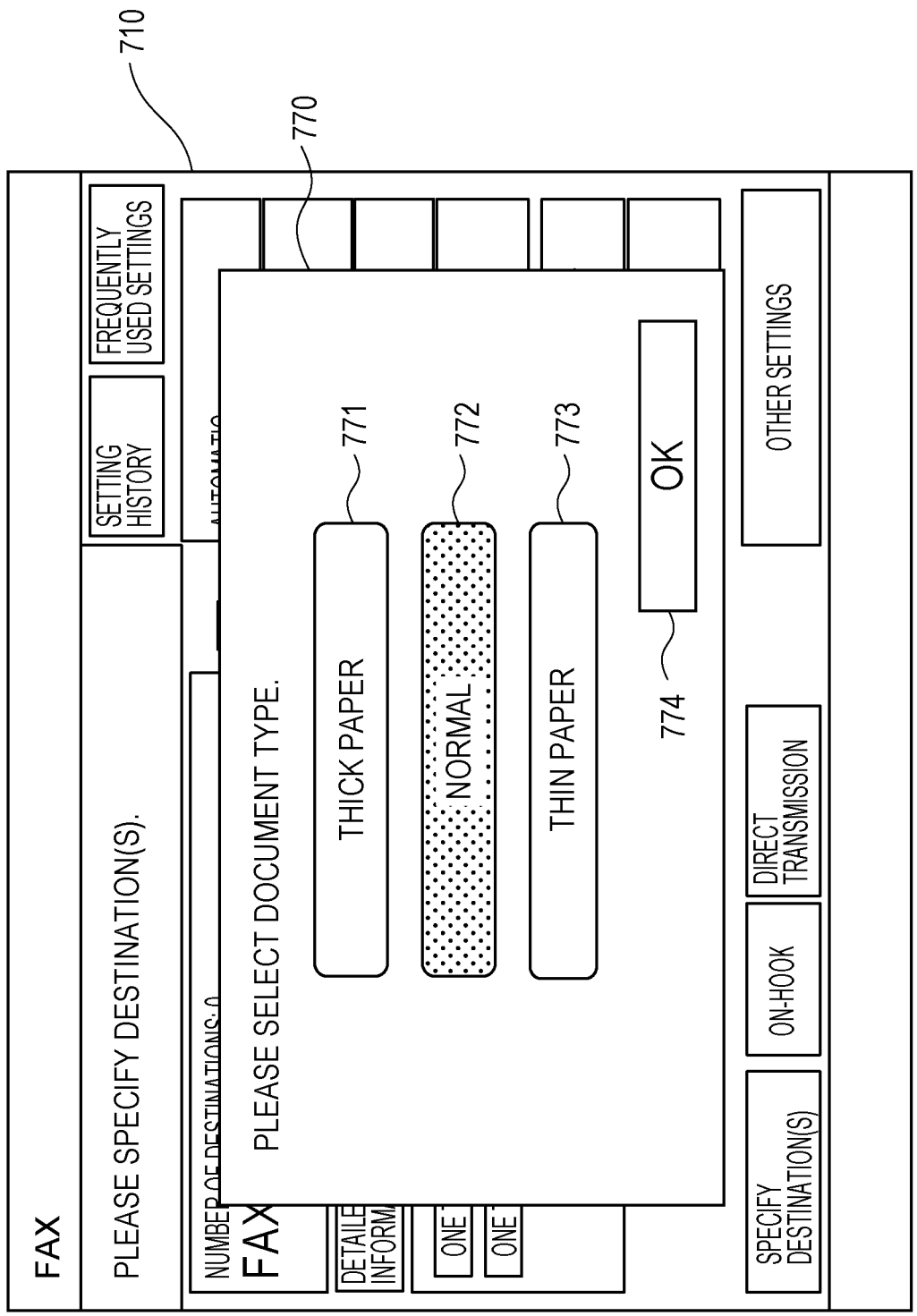

Note that, in the first embodiment, the paper thickness setting 801 set while the login screen 780 or the home screen 790 is displayed is transferred and used as the paper thickness setting 811 used in the copy function. However, this is not the only case, and values set through the copy screen 700 may also be transferred to the FAX screen 710 of FIGS. 10A and 10B and to data transmission functions (an email transmission function and a file transmission function examples of which are SMB and FTP). Specifically, information on a paper thickness set through the displayed paper thickness setting screen 770 while the copy screen 700 is displayed is stored not only in the paper thickness setting 811 of the copy settings 810 but also in the paper thickness setting 801 of the apparatus settings 800 in the RAM 406. (In this case, the paper thickness setting screen 770 may be manually displayed by using the "other functions" button 757, and may also be automatically displayed by document detection performed for the ADF 1000.) When the displayed screen is switched to the FAX screen 710, the value of the paper thickness setting 821 of the FAX settings 820 is overwritten with the value of the paper thickness setting 801 of the apparatus settings 800, a scan can be performed using the value in the FAX function. Also when the function is switched to a data transmission function, a scan can be similarly performed using the paper thickness setting in the data transmission function.

Conversely, the values set through the FAX screen 710 or the data transmission function may also be transferred to the copy screen 700. Specifically, information on a paper thickness set through the displayed paper thickness setting screen 770 while the FAX screen 710 is displayed is stored not only in the paper thickness setting 821 of the FAX settings 820 but also in the paper thickness setting 801 of the apparatus settings 800 in the RAM 406. (In this case, the paper thickness setting screen 770 may also be manually displayed by using the "other functions" button 757, and may also be automatically displayed by document detection performed for the ADF 1000.) This is a method in which when the displayed screen is switched to the copy screen 700, the value of the paper thickness setting 811 of the copy settings 810 is overwritten with the value of the paper thickness setting 801 of the apparatus settings 800, which enables a scan using the value in the copy function. Also when a data transmission function screen is switched to the copy function screen, a scan can be similarly performed using the paper thickness setting in the copy function.

Second Embodiment

Figure 11:
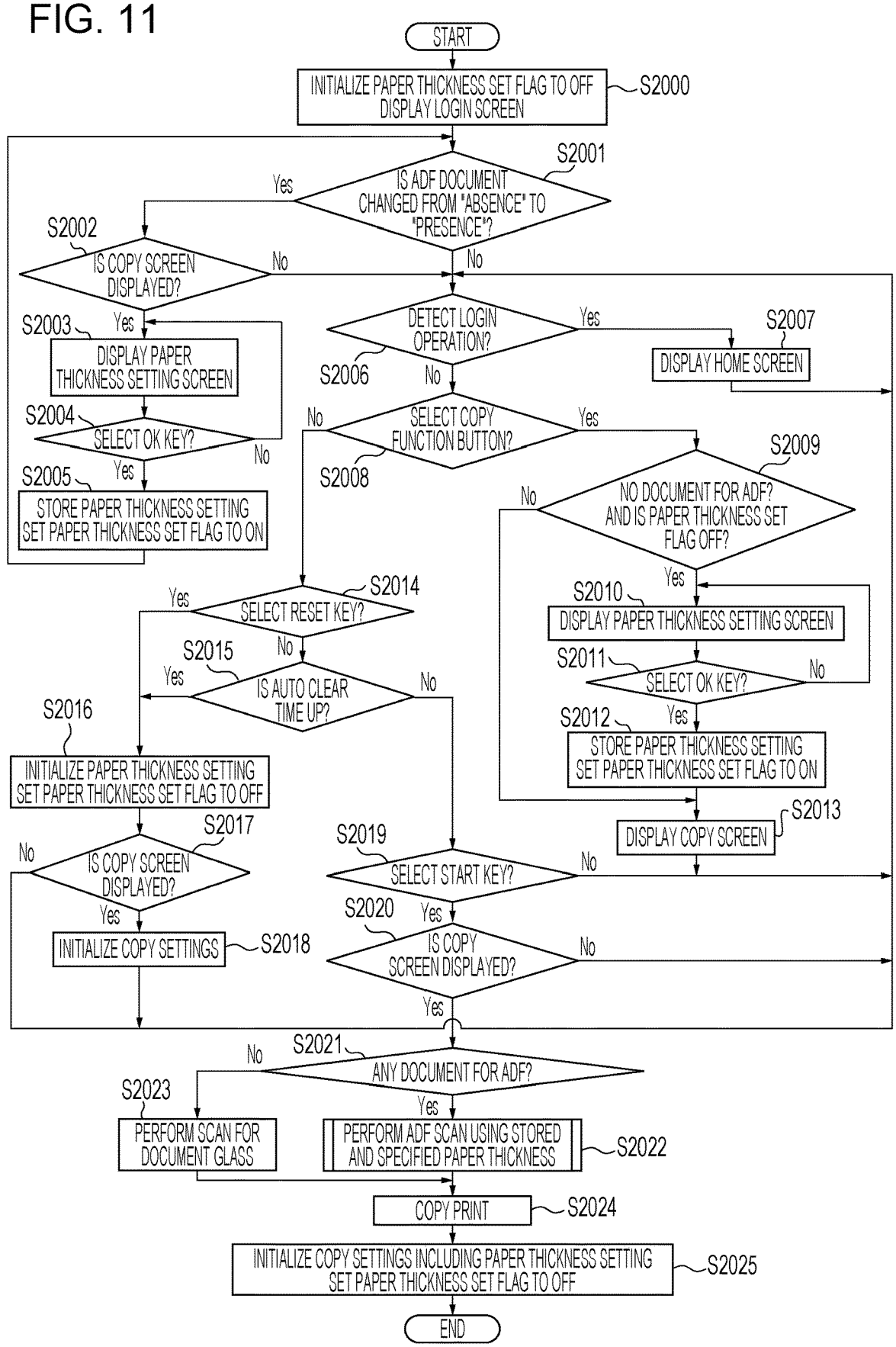
FIG. 11 is a flow chart illustrating paper thickness setting according to a second embodiment.

Next, using FIG. 11, a flow chart of processing in a certain case will be described, in which the paper thickness setting screen 770 is not displayed when a document is placed on the document tray 30 of the ADF 1000 before a function such as copy is selected, but the paper thickness setting screen 770 is displayed when the screen is switched to the copy screen 700. In this case, a description will be made using copy as an example of a function in which a scan is performed; however, this flow chart is applicable to other functions, examples of which are FAX and scan-transmission. Note that this series of processing processes is performed by the CPU 401 of the controller unit 400 executing a control program that is read out from the ROM 407 and loaded into the RAM 406.

First, in S2000, the CPU 401 initializes a paper thickness set flag to OFF. The CPU 401 then causes the LCD touch panel 600 to display the login screen 780 illustrated in FIG. 6.

Next, in S2001, the CPU 401 determines whether there is a change in the detection state of the document detection sensor 23 of the ADF 1000. In a case where a change from "absence" to "presence" is detected regarding a document, the process proceeds to S2002.

In S2002, the CPU 401 determines whether the screen displayed on the LCD touch panel 600 is the copy screen 700. When No in S2002, the process proceeds to S2006. When Yes in S2002, the process proceeds to S2003, and the CPU 401 causes the LCD touch panel 600 to display the paper thickness setting screen 770. Here, in a case where the OK key 774 has been selected (Yes in S2004), the process proceeds to S2005. In S2005, the CPU 401 stores information (thick paper/normal/thin paper) on the paper thickness selected at the point in time, in the paper thickness setting 811 of the copy settings 810 and the paper thickness setting 801 of the apparatus settings 800 in the RAM 406. The CPU 401 then changes the paper thickness set flag to ON. After S2005, the process returns to S2001. While the OK key 774 is not selected in S2004, the CPU 401 maintains display of the paper thickness setting screen 770.

When No in S2001, the process proceeds to S2006, and the CPU 401 determines whether a login operation is detected. In a case where a login operation is detected, the process proceeds to S2007, and the CPU 401 causes the LCD touch panel 600 to display the home screen 790 illustrated in FIG. 6. The process then proceeds to S2006.

In a case where no login operation is detected in S2006, the process proceeds to S2008, and the CPU 401 determines whether the copy function selection button 791 has been selected. Note that the copy function selection button 791 is a button displayed and selectable only on the home screen 790. Thus, in a case where the home screen 790 is not displayed, the determination in S2008 is always No. When Yes in S2008, the process proceeds to S2009, and it is determined whether there is a document on the basis of a value from the document detection sensor 23 of the ADF 1000. In a case where there is no document and where the paper thickness set flag is OFF, the process proceeds to S2013, and the CPU 401 causes the LCD touch panel 600 to display the copy screen 700. In the other cases (No in S2009), in S2010, the CPU 401 causes the LCD touch panel 600 to display the paper thickness setting screen 770. Here, in a case where the OK key 774 has been selected (Yes in S2011), information (thick paper/normal/thin paper) on the paper thickness selected at the point in time is stored in the paper thickness setting 811 of the copy settings 810 and the paper thickness setting 801 of the apparatus settings 800 in the RAM 406 (S2012). The paper thickness set flag is then changed to ON. While the OK key 774 is not selected in S2011, display of the paper thickness setting screen 770 is continued. After S2012, the process proceeds to S2013.

When No in S2008, the process proceeds to S2014, and the CPU 401 determines whether the reset key 603 has been selected. In a case where it is detected that the reset key 603 has been selected, the process proceeds to S2016, and the CPU 401 initializes information on the paper thickness setting 801 of the apparatus settings 800 stored in the RAM 406. The CPU 401 then initializes the paper thickness set flag to OFF. Next, in S2007, the CPU 401 determines whether the copy screen 700 is displayed on the LCD touch panel 600. In a case where the copy screen 700 is displayed, the process proceeds to S2018, and the CPU 401 initializes the copy settings 810 stored in the RAM 406 and the process proceeds to S2001. When No in S2017, the process proceeds to S2006.

In a case where selection of the reset key 603 is not detected in S2014, the process proceeds to S2015, and the CPU 401 determines whether it is detected that an auto clear time is up. In a case where the auto clear time is up, the process proceeds to S2016.

In a case where it is not detected in S2015 that the auto clear time is up, the process proceeds to S2019, and a determination as to whether selection of the start key 607 is detected is performed. In a case where selection of the start key 607 is not detected, the process proceeds to S2006. In a case where selection of the start key 607 is detected, the process proceeds to S2020. In S2020, the CPU 401 determines whether the copy screen 700 is displayed on the LCD touch panel 600. In a case where the copy screen 700 is not displayed, the process proceeds to S2001, and in a case where it is determined that the copy screen 700 is displayed, the process proceeds to S2021. In S2021, the CPU 401 determines whether there is a document on the document tray 30 of the ADF 1000 on the basis of a signal from the document detection sensor 23 of the ADF 1000. In a case where it is determined that there is a document on the document tray 30 of the ADF 1000, the process proceeds to S2022, and the CPU 401 controls a scan using the ADF 1000 using information on the paper thickness setting 811 of the copy settings 810 stored in the RAM 406. Details of S2022 are the same as those of the flow chart illustrated in FIG. 9.

In a case where it is determined in S2021 that no document is on the document tray 30 of the ADF 1000, the process proceeds to S2023, and the CPU 401 performs a scan of a document on the document glass 202. Note that this document is not conveyed and a document jam does not occur, and thus the information on the paper thickness setting 811 stored in the RAM 406 does not need to be used.

After execution of the scan is completed, the process proceeds to S2024, and the CPU 401 executes copying using the printer I/F 408. After the printing is completed, in S2025, the CPU 401 initializes the paper thickness setting 801 and the copy settings 810 stored in the RAM 406 and initializes the paper thickness set flag to OFF, and then this processing procedure ends.

According to the second embodiment, even in a case where the user places a document on the document tray 30 of the ADF 1000 before selecting a function, that is, logging in or while the menu screen is displayed, the thickness of a paper sheet of the document can be appropriately set.

Other Embodiments

Note that in the embodiments described above, the examples in which the thickness of a paper sheet of a document is selected from among three options, which are thick paper, normal paper, and thin paper; however, the number of options may be two, four, or greater than four. In addition, the thickness of a paper sheet of a document may also be set by causing the user to input a basis weight. In this case, it is sufficient if a basis weight greater than or equal to a preset first threshold is input by the user, the image forming apparatus determines that the document is a thick paper sheet, and if a basis weight less than a preset second threshold is input by the user, the image forming apparatus determines that the document is a thin paper sheet. In addition, it is sufficient if a basis weight less than the first threshold and greater than or equal to the second threshold is input by the user, the image forming apparatus determines that the document is a normal paper sheet and performs control described in the above-described embodiments.

Embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-246038, filed Dec. 27, 2018, which is hereby incorporated by reference herein in its entirety.

What is claimed is:

1. A multifunction apparatus comprising:
   a detector that detects that a document is placed on a document tray;
   a display that displays, in accordance with detecting placement of the document on the document tray by the detector, an object for receiving a thickness of the document from a user;
   a storage that stores information indicating the thickness received by the object;
   a conveyor that conveys the document based on the stored information indicating the thickness; and
   a scanner that scans the conveyed document,
   wherein the object is displayed in accordance with detecting placement of the document during the display displaying a function selection screen, through which at least a copy function is selected, and the storage stores the information indicating the thickness received by the displayed object, and
   wherein, after the copy function is selected and execution of the copy function is instructed, the conveyor conveys the document based on the stored information indicating the thickness.

2. The multifunction apparatus according to claim 1,
   wherein, in the function selection screen, a data transmission function is further able to be selected, and
   wherein after the data transmission function is selected and execution of the data transmission function is instructed, the conveyor conveys the document based on the stored information indicating the thickness.

3. The multifunction apparatus according to claim 1, wherein the conveyor controls a conveying speed of the document based on the stored information indicating the thickness.

4. The multifunction apparatus according to claim 1 further comprising a printer that prints an image of the document scanned by the scanner.

5. The multifunction apparatus according to claim 1 further comprising a communicator that transmits an image of the document scanned by the scanner to an external apparatus.

6. An image processing apparatus comprising:
a detector that detects that a document is placed on a document tray;
a display that displays, in accordance with detecting placement of the document on the document tray by the detector, an object for receiving a thickness of the document from a user;
a storage that stores information indicating the thickness received by the object;
a conveyor that conveys the document based on the stored information indicating the thickness; and
a scanner that scans the conveyed document,
wherein the object is displayed in accordance with detecting placement of the document during the display displaying a login screen, and the storage stores the information indicating the thickness received by the displayed object, and
wherein, after the user logs in the image processing apparatus and the user instructs execution of a copy function, the conveyor conveys the document based on the stored information indicating the thickness.

7. The image processing apparatus according to claim 6, wherein the conveyor controls a conveying speed of the document based on the stored information indicating the thickness.

8. The image processing apparatus according to claim 6, wherein the login screen is for receiving user identification information from the user.

9. The image processing apparatus according to claim 6, further comprising a printer that prints an image of the document scanned by the scanner.

10. The image processing apparatus according to claim 6 further comprising a communicator that transmits an image of the document scanned by the scanner to an external apparatus.

11. A control method for a multifunction apparatus, the control method comprising:
detecting that a document is placed on a document tray;
displaying, in accordance with detecting placement of the document on the document tray, an object for receiving a thickness of the document from a user;
storing information indicating the thickness received by the object;
conveying the document based on the stored information indicating the thickness; and
scanning the conveyed document,
wherein the object is displayed in accordance with detecting placement of the document during a function selection screen, through which at least a copy function is selected, being displayed, and the information indicating the thickness received by the displayed object is stored, and
wherein, after the copy function is selected and execution of the copy function is instructed, the document is conveyed based on the stored information indicating the thickness.

12. A non-transitory computer readable storage medium storing a program to cause a computer to execute a control method for a multifunction apparatus, the control method comprising:
detecting that a document is placed on a document tray;
displaying, in accordance with detecting placement of the document on the document tray, an object for receiving a thickness of the document from a user;
storing information indicating the thickness received by the object;
conveying the document based on the stored information indicating the thickness; and
scanning the conveyed document,
wherein the object is displayed in accordance with detecting placement of the document during a function selection screen, through which at least a copy function is selected, being displayed, and the information indicating the thickness received by the displayed object is stored, and
wherein, after the copy function is selected and execution of the copy function is instructed, the document is conveyed based on the stored information indicating the thickness.

* * * * *